Sept. 21, 1926.

G. CARTASSO

AIR VEHICLE

Filed Nov. 19, 1925

1,600,451

INVENTOR.
G. CARTASSO
BY
Harry C. Schroeder
ATTORNEYS.

Patented Sept. 21, 1926.

1,600,451

UNITED STATES PATENT OFFICE.

GIACOMO CARTASSO, OF OAKLAND, CALIFORNIA.

AIR VEHICLE.

Application filed November 19, 1925. Serial No. 69,987.

The present invention relates to improvements in air vehicles and its particular object is to point out certain structural designs allowing an air vehicle to serve various purposes and to substantially combine the functions of an airship, an aeroplane, a helicopter and a seaplane. My structure is particularly designed to improve the buoyancy of the vehicle which aids the power plant in lifting the device and which renders it more safe when riding on water. It is further proposed to provide a distribution of weight in such a manner that the vehicle is not likely to overturn but has a tendency to return to its normal position. Further objects and advantages of my device will appear as the specification proceeds.

Figure 1:
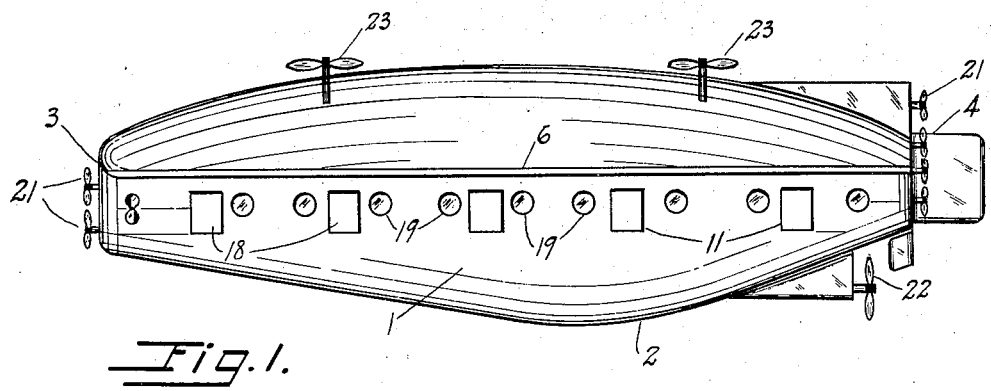
Figure 2:
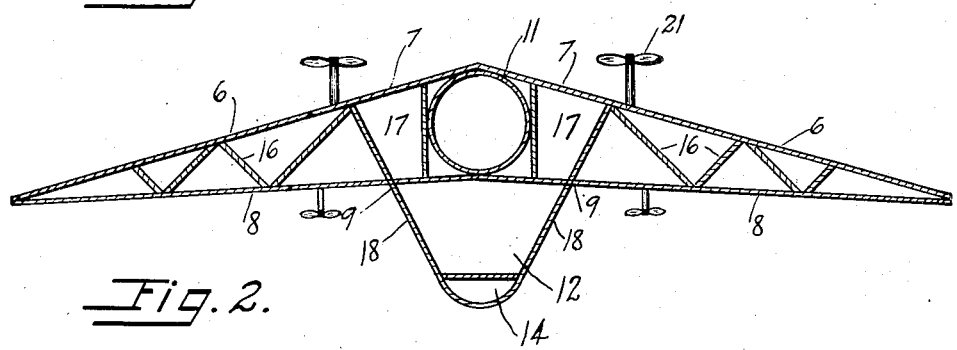
Figure 3:
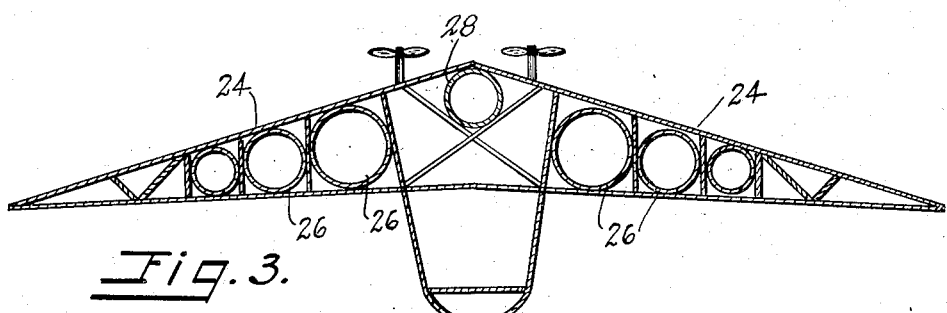
Figure 4:
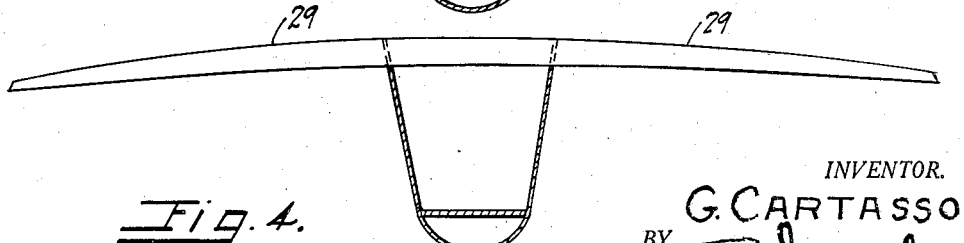

The preferred form of the invention is illustrated in the accompanying drawing, in which:

Figure 1 shows a side view of my air vehicle,

Figure 2 a vertical transverse section through the same,

Figure 3 a transverse section through an air vehicle of slightly modified form, and Figure 4 a transverse section through a vehicle of a further modified form.

It should be understood of course that the means for propelling the vehicle do not form a part of the present invention and therefore have not been shown in the drawing.

While I have shown only the preferred form of the invention, it should be understood that various changes or modifications may be made within the scope of the claims hereto attached, without departing from the spirit of the invention.

In its preferred form, as illustrated in Figures 1 and 2, my air vehicle comprises an elongated body 1 somewhat of the shape of the body of an airship, but preferably formed with a bottom projecting downwardly at the central portion as shown at 2 so that when the device is floating on water its two ends, 3 and 4, remain above the water while the central projecting portion is submerged. Wings 6 extend laterally from the body in such a manner that the upper faces of the same merge into the upper face of the body as at 7 without causing any bend while the lower faces 8 strike an intermediate portion of the body as at 9. That part of the body between the two wings is preferably occupied by a bag 11 filled with lighter-than-air substance while the chamber 12 below the said upper portion is reserved for cargo space or for passengers and a small additional space 14 at the bottom of the vehicle has the fuel or other ballast stored therein. The wings are braced internally in any suitable manner as by braces 16 and some space is left at 17 on opposite sides of the bag 11 which space may also be used for accommodation for passengers or cargo. The cargo space 12 is made accessible by doors 18 and is provided with a plurality of windows 19.

In other features my vehicle substantially resembles air vehicles now in use and is provided with propellers 21 in the front and at the rear and preferably with propellers 22 near the bottom which latter are adapted to be used for propelling the vehicle on the water. Propellers 23 may be provided on a vertical axis to obtain a helicopter effect.

In the view shown in Figure 3 the wings 24 are also equipped with bags 26 filled with lighter-than-air material and if these bags are used it may be advantageous to reduce the size of the central bag 28 in the manner illustrated in Figure 3.

In Figure 4 a further modification is shown in which the lighter-than-air bags are eliminated altogether and the wings 29 are reduced in thickness to a considerable extent while the principle of joining the upper faces of the wings to the upper face of the body in an unbroken line is preserved.

I claim:

A device of the type described comprising a long, narrow body section formed with a bottom projecting downwardly at the central portion thereof, wings projecting laterally from said body and extending the entire length of the same, the upper faces of said wings merging in straight lines into the top of said body portion and the lower faces striking the body at an intermediate section thereof and being substantially straight and aligned with one another, lifting means within the wings and that portion of the body confined therebetween, a plurality of propellers for moving said airship horizontally and vertically and means for guiding said airship through the air.

In testimony whereof I affix my signature,

GIACOMO CARTASSO,